US007779885B2

(12) United States Patent
Takami et al.

(10) Patent No.: US 7,779,885 B2
(45) Date of Patent: Aug. 24, 2010

(54) LABEL PEELING MECHANISM AND LABEL PRINTER

(75) Inventors: Toru Takami, Shiojiri (JP); Koji Yamada, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 1296 days.

(21) Appl. No.: 11/199,643

(22) Filed: Aug. 9, 2005

(65) Prior Publication Data

US 2006/0027333 A1 Feb. 9, 2006

(30) Foreign Application Priority Data

Aug. 9, 2004 (JP) ............................. 2004-232772
Aug. 9, 2004 (JP) ............................. 2004-232773

(51) Int. Cl.
*B29C 63/00* (2006.01)

(52) U.S. Cl. ....................... 156/584; 156/221; 156/247; 156/249; 156/344

(58) Field of Classification Search ................. 156/344, 156/584, 221, 247, 249
See application file for complete search history.

(56) References Cited

U.S. PATENT DOCUMENTS

| | | | | |
|---|---|---|---|---|
| 3,530,028 | A * | 9/1970 | Messmer | 156/584 |
| 4,560,087 | A * | 12/1985 | Sato et al. | 221/73 |
| 5,427,460 | A * | 6/1995 | Kajiya | 400/118.1 |
| 6,092,945 | A * | 7/2000 | Takami et al. | 400/613 |
| 6,231,253 | B1 * | 5/2001 | Henderson et al. | 400/618 |
| 6,349,756 | B1 * | 2/2002 | Brough et al. | 156/584 |
| 6,433,808 | B1 * | 8/2002 | Kershner et al. | 347/215 |
| 6,505,981 | B1 * | 1/2003 | Takami et al. | 400/602 |
| 6,544,378 | B2 * | 4/2003 | Brough et al. | 156/344 |
| 7,121,313 | B2 | 10/2006 | Ito | |

FOREIGN PATENT DOCUMENTS

| | | |
|---|---|---|
| CN | 2603015 Y | 2/2004 |
| JP | 62-016508 | 1/1987 |
| JP | 04-040061 | 4/1992 |
| JP | 04-272876 | 9/1992 |
| JP | 05-330532 A | 12/1993 |
| JP | 07-040951 A | 2/1995 |
| JP | 07-237625 | 9/1995 |
| JP | 09-086526 A | 3/1997 |
| JP | 10-006594 | 1/1998 |
| JP | 11-029125 | 2/1999 |
| JP | 2000-301787 | 10/2000 |
| JP | 2000-335818 | 12/2000 |
| JP | 2001-139010 A | 5/2001 |
| JP | 2001-192166 | 7/2001 |
| JP | 2001-261226 | 9/2001 |
| JP | 2002-179306 | 6/2002 |
| JP | 2004-115041 | 4/2004 |
| JP | 2004-184453 | 7/2004 |

* cited by examiner

*Primary Examiner*—Kat Wyrozebski
*Assistant Examiner*—Joshel Rivera

(57) ABSTRACT

A label peeling mechanism for a label printer comprising a web-bending guide having a convex curved surface for bending a continuous web having labels affixed to the web; an upstream web pressure guide disposed downstream of a said print head in the label printer and having a plurality of ribs disposed upstream in the web transportation direction from the convex curved surface of the web-bending guide opposite an upstream guide surface of the web-bending guide for contacting the web before peeling the labels from the web and a downstream web pressure guide disposed downstream in the web transportation direction.

15 Claims, 14 Drawing Sheets

LABEL PEELING MECHANISM AND LABEL PRINTER

BACKGROUND OF THE INVENTION

1. Field of Technology

The present invention relates to a label peeling mechanism for peeling labels from a web liner to which the labels are adhesively affixed by conveying the label paper with the web curving acutely back to itself from the non-label side of the web liner. The invention also relates to a label printer having a label peeling mechanism for peeling labels from the web liner after the labels are printed.

2. Description of the Related Art

Label printers for printing and issuing labels typically print to rolled label paper composed of a web liner having adhesive labels of a constant length peelably affixed to one side (referred to herein as the "front") of the web. This label printer conveys the label paper until a label reaches the printing position where the label is printed by the printing mechanism. The label paper is then conveyed downstream to the label peeling mechanism whereby the printed labels are removed from the web, and the peeled labels and the web liner are then discharged from separate discharge paths. A typical label peeling mechanism conveys the web with the labels affixed thereto through a path that curves the web from the back side (non-label side) thereof through an angle of less than or equal to 90 degrees and uses the stiffness of the labels (out-of-plane stiffness) to gradually disengage the labels from the liner starting from the leading edge of each label. A printer having this type of label peeling mechanism is taught in Japanese Unexamined Patent Appl. Pub. H4-272876, for example.

This type of label peeling mechanism has a web guide disposed to curve and guide the back side of the web liner around a corner of 90 degrees or less, and conveys the web liner in contact with this web guide. The smaller the radius of curvature through which the web liner is conveyed, the more reliably the labels can be peeled from the liner.

When the label paper is provided in a roll, a continuous web liner having labels affixed on the surface thereof at a constant interval is wound onto a roll. The labels are affixed with adhesive to the surface of the web, and adhesive is left on the surface of the web even after the labels are peeled from the web. A small amount of adhesive is also present around the area of the labels affixed to the web. This results in the transfer of adhesive to the parts of the transportation path that contact the web and the label surfaces. As adhesive thus accumulates on the transportation path, the web and labels tend to stick to these parts of the transportation path that are now sticky. This makes it difficult to transport the web accurately for label positioning, for example, and also leads to paper jams and other problems.

SUMMARY OF THE INVENTION

An advantage of a label peeling mechanism according to the present invention is that paper jams and other problems that result from the adhesive of the label sticking to the transportation path can be prevented, and the web liner and labels can thus be reliably transported. A label printer according to the present invention having this label peeling mechanism also affords the same advantages.

To achieve the foregoing object, a label peeling mechanism according to the present invention has a web-bending guide having a convex curved surface for bending a continuous web having labels affixed to the front surface thereof to an angle of less than or equal to 90 degrees with respect to the back side of the web; an upstream web pressure guide disposed upstream in the web transportation direction from the convex curved surface opposite a guide surface portion of the web-bending guide; and a downstream web pressure guide disposed downstream in the web transportation direction from the contact surface opposite a guide surface portion of the web-bending guide. A plurality of contact parts for contacting the surface of the web are disposed to at least one of the upstream web pressure guide and downstream web pressure guide across the web width with a gap therebetween that is perpendicular to the direction of the web transportation direction. The web is conveyed between the upstream guide surface portion and the upstream web pressure guide, curves 90 degrees or less around the convex curved surface, and is then conveyed between the downstream guide surface portion and the downstream web pressure guide. The labels are peeled from the web as the web is curvedly conveyed around the convex curved surface.

This label peeling mechanism has an upstream web pressure guide and a downstream web pressure guide on the upstream and downstream sides of the convex curved surface in the web transportation direction to prevent the web from being lifted away from the convex curved surface, thus enabling the web to be conveyed through a small radius of curvature. The labels can thus be reliably peeled from the web as the web travels around this convex curved surface. The upstream web pressure guide and downstream web pressure guide which contact the front surface of the web have contact parts that touch the web at limited positions across the width of the web as the web is conveyed thereby. The contact area with the surface of the web and labels can thus be minimized, and accumulation of adhesive on the upstream web pressure guide and downstream web pressure guide is inhibited.

Furthermore, even if adhesive from the web surface adheres to the contact parts, the adhesive gradually moves from these contact parts to gaps therebetween perpendicularly to the web in conjunction with web transportation. Accumulation of adhesive on these contact parts is thus prevented, problems such as paper jams are prevented, and the web can be transported smoothly.

Further preferably, contact parts form ribs, and said ribs have a tapered surface on both sides near the distal end that contacts the web, forming a tapered section that gradually narrows from the base to the distal end of the rib.

Alternatively, the contact parts form rollers, and said rollers have a tapered surface on both sides near the outside circumference end that contacts the web, forming a tapered section that gradually narrows from the base to the outside circumference.

These ribbed or roller contact parts reduce the contact area with the surface of the web and labels, effectively promoting the movement of adhesive from the contact parts widthwise to gaps therebetween perpendicularly to the web in conjunction with the web transportation, and thus more efficiently prevent the accumulation of adhesive on the contact parts.

Yet further preferably, the contact parts of the upstream web pressure guide curve to the downstream side in the web transportation direction in the opposite direction as the direction in which the web is bent by the web-bending guide and gradually narrow the web transportation path.

This arrangement prevents the web from being lifted away from the convex curved surface on the upstream side of the convex curved surface in the web transportation direction, and thus enables conveying the web through a smaller radius of curvature. Furthermore, the labels can be more reliably peeled from the web because the labels are curved by this curved surface in the direction that disengages from the web.

A label peeling mechanism according to another aspect of the present invention has a web-bending guide having a convex curved surface for bending a continuous web having labels affixed to the front surface thereof to an angle of less than or equal to 90 degrees with respect to the back side of the web; an upstream web pressure guide disposed upstream in the web transportation direction from the convex curved surface opposite a guide surface portion of the web-bending guide; and a downstream web pressure guide disposed downstream in the web transportation direction from the contact surface opposite a guide surface portion of the web-bending guide. A plurality of recessed parts which do not contact the surface of the web are disposed to at least one of the upstream web pressure guide and downstream web pressure guide across the web width with a gap therebetween that is perpendicular to the direction of the web transportation direction. The web is conveyed between the upstream guide surface portion and the upstream web pressure guide, curves 90 degrees or less around the convex curved surface, and is then conveyed between the downstream guide surface portion and the downstream web pressure guide. The labels are peeled from the web as the web is curvedly conveyed around the convex curved surface.

This label peeling mechanism has an upstream web pressure guide and a downstream web pressure guide on the upstream and downstream sides of the convex curved surface in the web transportation direction to prevent the web from lifting away from the convex curved surface, thus enabling the web to be conveyed through a small radius of curvature. The labels can thus be reliably peeled from the web as the web travels around this convex curved surface. The multiple recessed portions disposed across the width of the web in the upstream web pressure guide and downstream web pressure guide that contact the surface of the web also minimize the contact area with the surface of the web and labels, thus making it difficult for adhesive to accumulate on the upstream web pressure guide and the downstream web pressure guide. Furthermore, even if adhesive from the web surface sticks to the upstream web pressure guide or downstream web pressure guide, the adhesive moves gradually into the recessed portions in conjunction with web travel. Accumulation of adhesive on the contact parts is thus prevented, problems such as paper jams are prevented, and the web can be smoothly transported.

Further preferably, the label peeling mechanism according to another aspect of this invention has a web-bending guide having a convex curved surface for bending a continuous web having labels affixed to the front surface thereof to an angle of 90 degrees or less with respect to the back side of the web. The labels are peeled from said web as the web is conveyed curved 90 degrees or less around the convex curved surface, and at least the surface of the portion which contacts said web surface when the web is conveyed is a non-stick surface.

By using a non-stick material to form or coat at least the surface of the contact parts in this label peeling mechanism, it is difficult for the adhesive to stick to the non-stick contact parts when the non-stick contact parts touch the web surface. Accumulation of adhesive is thus prevented even without minimizing the contact area with the web surface, and problems such as paper jams can thus be prevented.

Yet further preferably, this label peeling mechanism has a label guide roller which supports said labels as said labels are peeled from the web and discharged as said web is conveyed curved 90 degrees or less around the convex curved surface.

The label guide roller of this label peeling mechanism thus supports the labels as the labels are peeled from the web curved by the web-bending guide and discharged. The peeled labels are thus prevented from dropping or drooping. If the labels drop from the label dispenser opening, the labels will stick to the work table or floor. If the labels are long, the drooping portion of the label may stick to the case of the label printer.

Yet further preferably, this label peeling mechanism preferably also has a label discharge roller which discharges labels as the labels are peeled from the web. This label discharge roller is disposed between the web-bending guide and the label guide roller. A trailing end portion of the peeled label is supported by the label discharge roller and a middle portion of the label is supported by the label guide roller as said label is peeled and discharged. The label can thus be completely peeled from the web without the trailing end of the label remaining affixed to the web, the label can be prevented from dropping and the leading end of the label can be prevented from drooping, thus enabling the user to more easily remove the label.

Alternatively, a trailing end portion of the label can be supported by the web and a middle portion of the label can be supported by the label guide roller as the label is peeled and discharged.

The label can thus be held at multiple locations at the trailing end and middle, and reliably supported without drooping.

Further preferably, each of the label guide roller and the label discharge roller is a coaxial assembly of a plurality of rollers and the adhesive strength of the surface of the rollers when in contact with the adhesive surface of the labels differs.

The surface of some of these rollers could have relatively high adhesive strength with the adhesive surface of the labels, and other rollers could have relatively low adhesive strength. By combining a number of such rollers coaxially to form the label guide roller and label discharge roller, the label holding strength of the rollers can be optimally set.

A label printer according to another aspect of the present invention has a label peeling mechanism according to the present invention as described above, a print head for printing said labels; a transportation mechanism for conveying a continuous web with labels affixed thereto sequentially passed a printing position for printing by said print head and a label peeling position for peeling labels by said label peeling mechanism; a web discharge opening for discharging said web after said labels are peeled; and a label dispenser opening for discharging said labels after said labels are peeled from said web.

Further preferably, the print head is a thermal head; and said transportation mechanism comprises a platen roller which is pressed to said thermal head.

This label printer can thus reliably and completely separate labels conveyed through the label peeling mechanism from a web liner and dispense the labels from the printer. Problems such as paper jams caused by labels separating from the web and becoming stuck inside the paper path can thus be prevented, and a high reliability label printer can therefore be provided.

A label peeling mechanism and label printer according to the present invention minimizes the transfer and adherence of adhesive to the web liner transportation path, prevents accumulation of adhesive in the parts of the transportation path that contact the web and labels, and can thus smoothly conveys the web without such problems as paper jams.

Other objects and attainments together with a fuller understanding of the invention will become apparent and appreciated by referring to the following description and claims taken in conjunction with the accompanying drawings.

DETAILED DESCRIPTION OF THE PREFERRED EMBODIMENTS

Preferred embodiments of a label printer having a label peeling mechanism according to the present invention are described below with reference to the accompanying figures.

Figure 1:
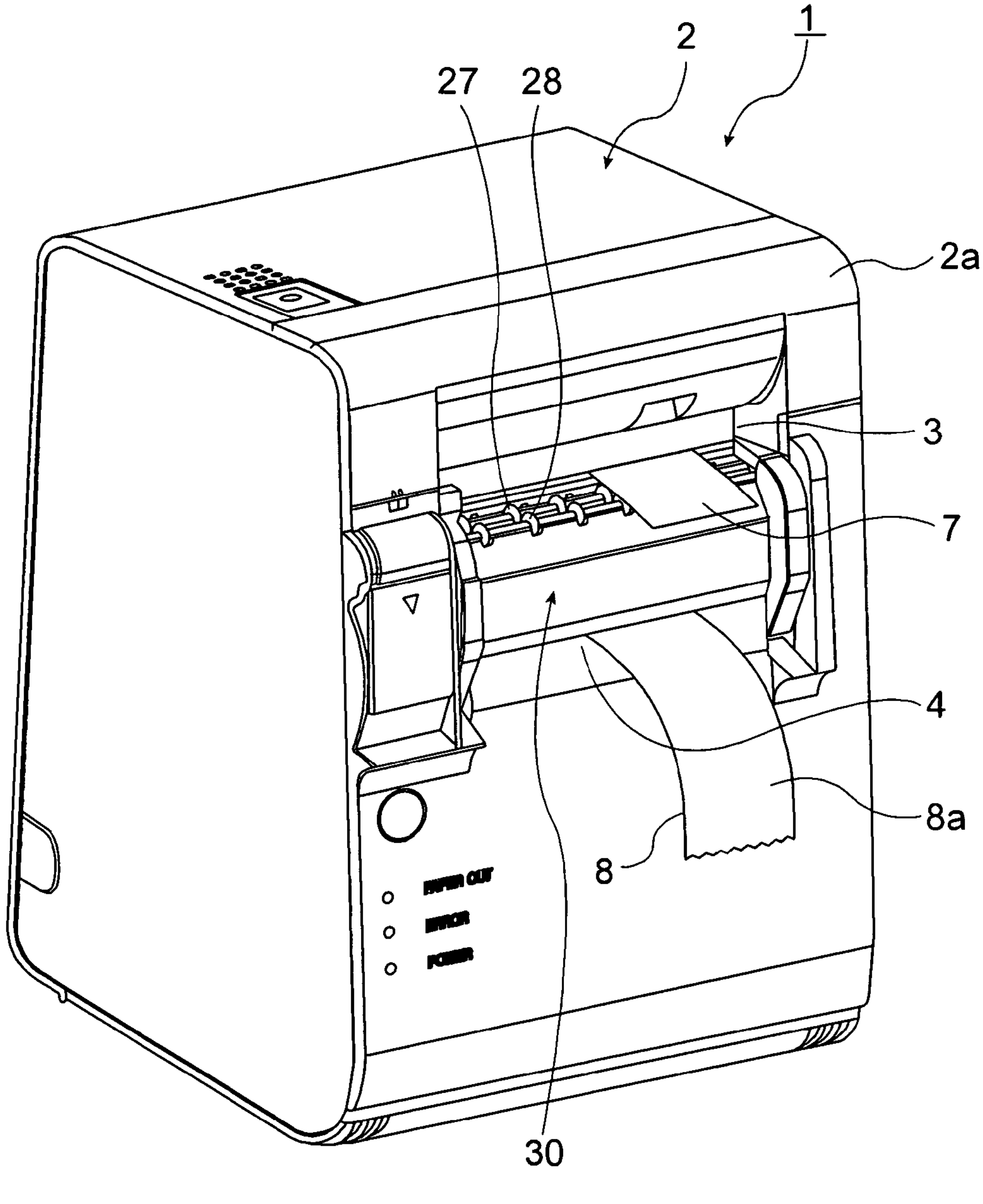
FIG. 1 is an oblique external view of a label printer according to the present invention.
Figure 2:
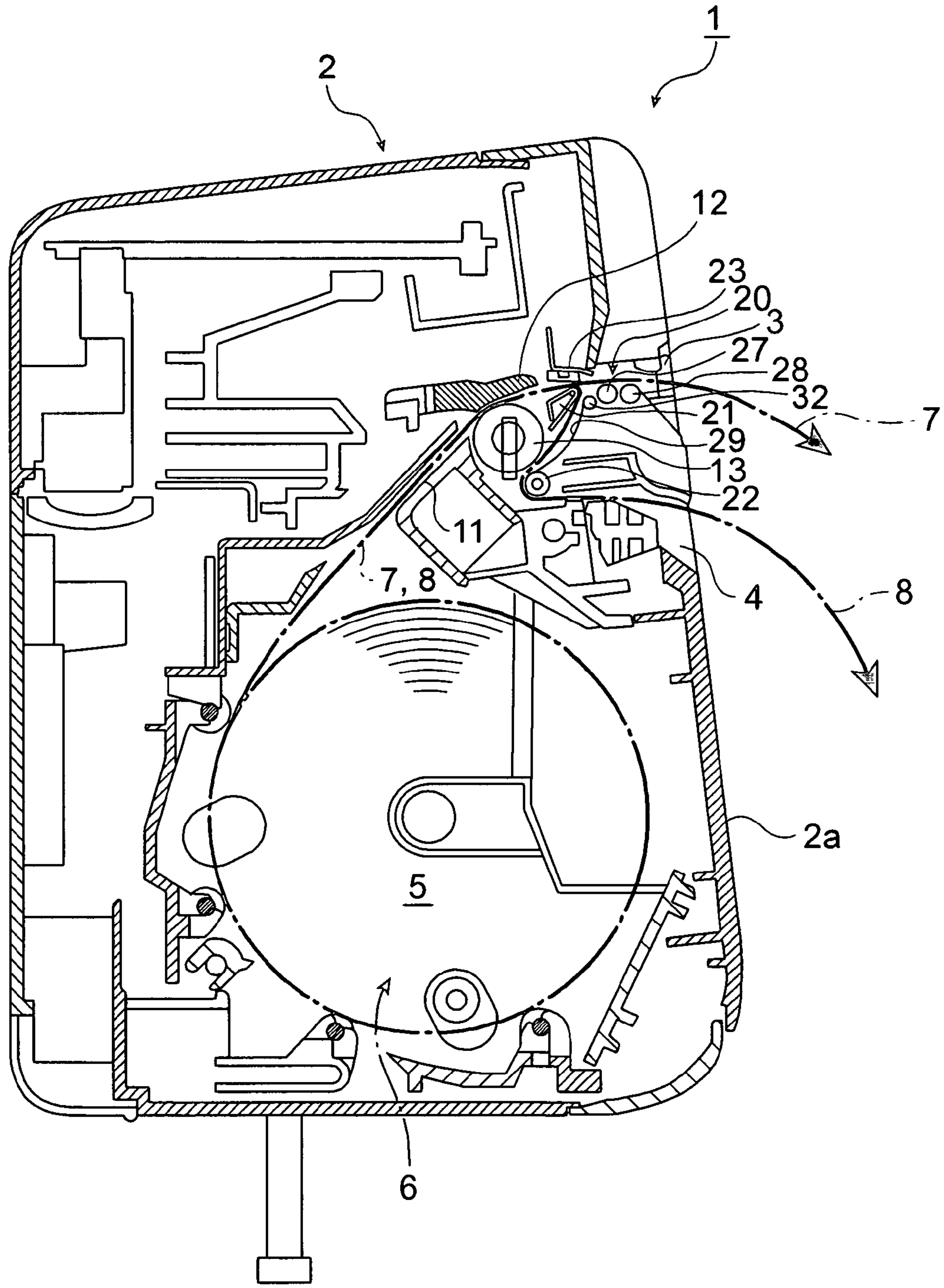
FIG. 2 is a side section view of the label printer shown in FIG. 1.
Figure 3:
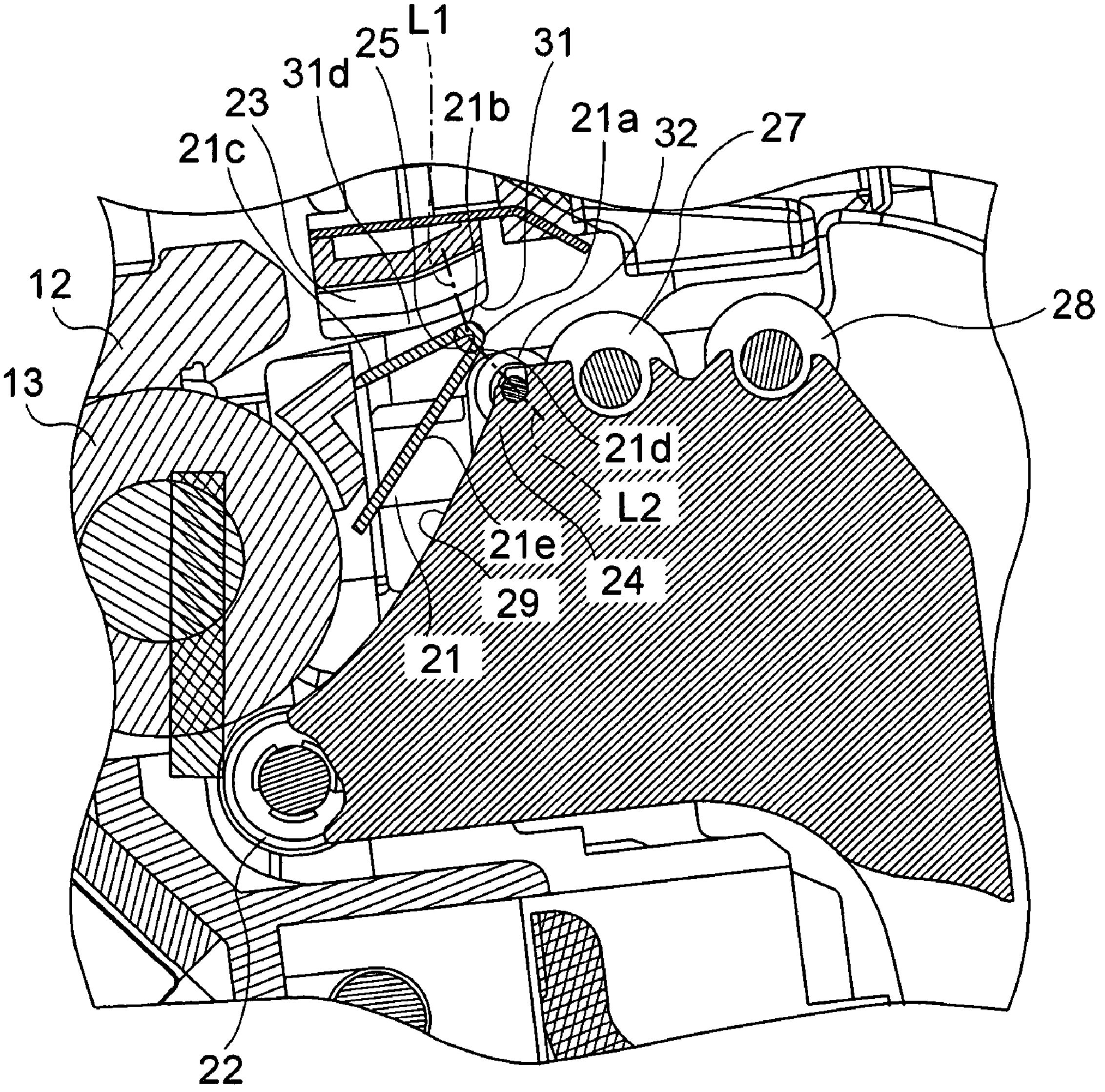
FIG. 3 is a partially enlarged section view showing the label peeling mechanism of the label printer shown in FIG. 1.

FIG. 1 is an external oblique view of a label printer 1 according to the present invention, FIG. 2 is a side section view showing the internal configuration of the label printer, and FIG. 3 is an enlarged partial section view showing the label peeling mechanism in the label printer.

The label printer 1 according to this embodiment of the invention, shown in FIGS. 1-7, has a printer case 2 that is substantially parallelepiped in shape with a label dispenser opening 3 formed at the top and a web discharge opening (exit) 4 at the bottom of the front portion 2*a* of the printer case 2. A roll paper compartment 5 is formed in the lower half of the inside of the printer case 2. Roll paper 6 for label printing is loaded into the roll paper compartment 5.

The roll paper 6 for printing labels is composed of a continuous web 8 having a constant width with typically rectangular labels 7 affixed thereto at a regular interval wound into a roll. An adjustable paper guide not shown is disposed inside the label printer 1 (such as in the roll paper compartment 5) to control the width of the roll paper 6 and web 8, and can be set to the width of the roll paper 6 in use.

Note that the dot-dash line indicated by reference numeral 8 in FIG. 2 denotes the transportation path of the web 8 when the peeling mechanism 20 is used, and the imaginary line denoted by reference numeral 7 denotes the transportation path of the labels 7 when the peeling mechanism 20 is used.

The web 8 having labels affixed thereto is delivered through the transportation path 11 from the roll paper 6 loaded in the roll paper compartment 5, is held between the platen roller 13 and thermal print head 12, and is conveyed by rotation of the platen roller 13. The labels 7 are affixed to the front side 8*a* of the web 8. After a label 7 is printed by the print head 12, the web 8 is conveyed through the label peeling mechanism 20.

The label peeling mechanism 20 has a web-bending guide 21 that is bent to an acute angle in a substantially V-shaped configuration. As the web 8 is conveyed around the apex of this web-bending guide 21, the printed labels 7 are gradually peeled from the leading edge thereof from the web 8 and discharged from the label dispenser opening 3.

A peeling roller 22, which is part of the label peeling mechanism 20, is disposed on the downstream side of the web 8 transportation path at a position on the opposite side of the platen roller 13 as the print head 12. When the label peeling mechanism 20 is closed, the peeling roller 22 is pressed to the outside surface of the platen roller 13 and thus rotates following the rotation of the platen roller 13. After the labels 7 are peeled from the web 8, the web 8 proceeds along the web-bending guide 21 and is held by the platen roller 13 and peeling roller 22. Rotation of the platen roller 13 conveys the web 8 around the outside of the peeling roller 22 to the front of the printer, and the web 8 is thus discharged from the web exit 4.

The label peeling mechanism 20 for peeling the printed labels 7 from the web 8 is described next with reference to FIG. 2 and FIG. 3.

The web-bending guide 21 of the label peeling mechanism 20 has a curved surface 21*a* formed at the distal end. This curved surface 21*a* is a convex curved surface with a small radius of curvature. A flat, upstream guide surface 21*c* continues smoothly from the upstream-side end 21*b* of the curved surface 21*a* in the web transportation direction. A flat, downstream guide surface 21*e* continues smoothly from the downstream-side end 21*d* of the curved surface 21*a* in the web 8 transportation direction.

An upstream-side web pressure guide 23 having a plurality of ribs 31 at specific intervals across the width of the web is disposed opposite the upstream guide surface 21*c*. A downstream-side web pressure guide 24 having a plurality of guide rollers 32 at specific intervals across the width of the web is similarly disposed opposite the downstream guide surface 21*e*. The distance between the upstream guide surface 21*c* and the ribs 31 of the upstream web pressure guide 23 is slightly greater than the total thickness of the web 8 and labels 7.

This gap is made gradually narrower from the upstream to the downstream side of the web transportation direction by means of upstream ribs 31*d* having a convex arc shape that curves in the opposite direction as the direction that the web is curved by the web-bending guide 21. This has the effect of pressing the web 8 to the web-bending guide 21 on the upstream side of the transportation path.

More specifically, the upstream ribs 31*d* press the web 8 on the upstream side of the curved surface 21*a* of the web-bending guide 21 near the line L1 joining the end 21*b* and center of curvature 25 that define the curved surface 21*a* in this transportation path, and the guide roller 32 presses the web 8 on the downstream side of the curved surface 21*a* of the web-bending guide 21 near line L2 joining center of curvature 25 and end 21*d*. The web 8 is pressed on two points of the upstream side (L1) and the downstream side (L2) of the curved surface 21*a* of the web-bending guide 21. This arrangement prevents the web 8 from bulging away from the curved surface 21*a*, and enables conveying the web 8 through a smaller radius of curvature.

Furthermore, as the web 8 is conveyed through the curved part of the upstream ribs 31*d* and ribs 31, the labels 7 are curved along this curved portion in the direction disengaging from the web 8, and the labels 7 can thus be more reliably peeled from the web 8. The upstream ribs 31*d* also guide the web 8 to the curved surface 21*a* of the web-bending guide 21 with the web 8 curved slightly to the back, and the web 8 is then curved acutely around this curved surface 21*a*. This arrangement enables conveying the web 8 through a smaller radius of curvature.

The ribs 31 of the upstream web pressure guide 23 extend a specified length to the downstream side of the web transportation direction beyond the upstream-side end 21*b* of the curved surface 21*a* of the web-bending guide 21. More specifically, these ribs 31 extend downstream from the line L1 joining the end 21*b* and center of curvature 25 that define the curved surface 21*a*.

The outside surface of the guide roller 32 in the other (i.e., downstream) web pressure guide 24 projects a specific length upstream in the web transportation direction from the downstream end 21*d* of the curved surface 21*a*. More specifically, the outside surface of the guide roller 32 projects upstream from the line L2 joining center of curvature 25 and end 21*d*.

In other words, upstream ribs 31*d* having a convex arc shape that causes the web 8 to convexly curve to the surface side (label side) of the web as the web 8 travels toward curved surface 21*a* is disposed to the upstream web pressure guide 23 at a position on the upstream side in the web transportation direction. These upstream ribs 31*d* protrude slightly to the upstream guide surface 21*c* side from the ribs 31 of the upstream web pressure guide 23 so that the web 8 can be made to curve slightly in the opposite direction as the web 8 curvature caused by the curved surface 21*a*. After the web 8 is thus curved slightly to the surface side (label side) by means of the upstream ribs 31*d*, the web 8 is then guided to the curved surface 21*a* of the web-bending guide 21 and is curved to an acute angle as the web 8 travels around the curved surface 21*a*. The upstream ribs 31*d* connect smoothly to the ribs 31. The web 8 is pressed on two points of the upstream side (L1) and the downstream side (L2) of the curved surface 21*a* of the web-bending guide 21. This arrangement prevents the web 8 from bulging away from the curved surface 21*a*, and enables conveying the web 8 through a smaller radius of curvature.

Figure 4:
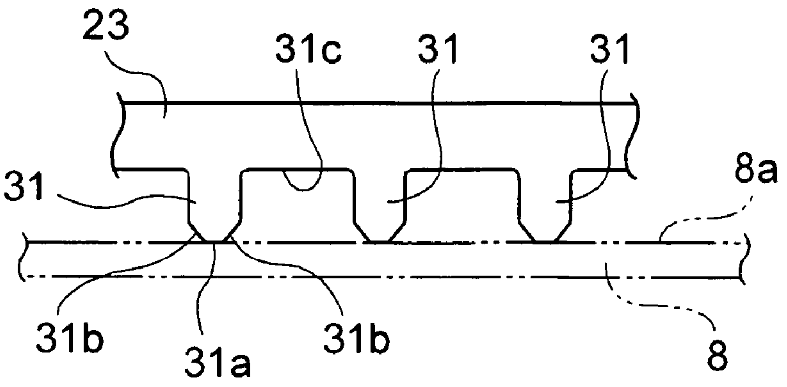
FIG. 4 is a front view of the upstream web pressure guide in the label printer shown in FIG. 1.

As shown in FIG. 4, the upstream web pressure guide 23 has a plurality of ribs 31 (and upstream ribs 31*d*) disposed at a specific interval across the width of the web 8, that is, perpendicularly to the web transportation direction. Each rib 31 (and upstream ribs 31*d*) has a contact surface 31*a* which contacts the front side 8*a* of the web 8. A tapered surface 31*b* is formed on both sides of the contact surface 31*a* so that the width of the taper is narrowest at the contact surface 31*a*, thus minimizing the contact area with the front side 8*a* of the web 8. The space between each of the ribs 31 (and upstream ribs 31*d*) forms a recess (gap) 31*c* in this upstream web pressure guide 23. The ribs 31 (and upstream ribs 31*d*) that contact the front side 8*a* of the web 8 are made from a non-stick compound such as silicon plastic or fluoro plastic. Alternatively, just the surfaces of the ribs 31 and (upstream ribs 31*d*) could be coated with a non-stick compound such as silicon plastic or fluoro plastic. Further alternatively, a non-stick compound such as silicone oil could be applied to only the surfaces of the ribs 31 and upstream ribs 31*d*. The guide rollers 32 are also preferably treated to have a non-stick surface. The label discharge roller 27 and label guide rollers 28 that contact the adhesive surface of the label 7 at the label dispenser opening 3 are also preferably treated for non-stickiness. The adhesive strength of the acrylic emulsion adhesive typically used as the label 7 adhesive relative to silicone oil is very low.

Figure 5:
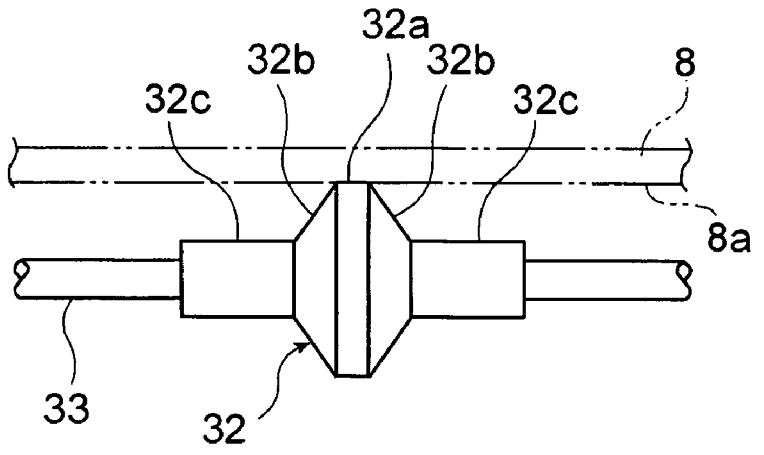
FIG. 5 is a front view showing a guide roller of the downstream web pressure guide.

The guide roller 32, which is the contact portion of the downstream web pressure guide 24, is composed of a plurality of roller segments disposed with a specific gap therebetween across the width of the web 8, that is, perpendicularly to the transportation direction of the web 8. As shown in FIG. 5, the guide rollers 32 are rotatably supported on a support shaft 33. Each guide roller 32 has a contact surface 32*a* that contacts the front side 8*a* of the web 8. A tapered surface 32*b* is formed on each side of the contact surface 32*a* so that the taper narrows toward the outside surface and is narrowest at the contact surface 32*a*, thus minimizing the contact area with the front side 8*a* of the web 8. A small diameter recessed portion 32*c* is also formed on both sides of the guide roller 32 so as to not contact the front side 8*a* of the web 8.

The label discharge roller 27 is freely rotationally disposed on the downstream side near the curved surface 21*a* of the web-bending guide 21. The top portion of the outside surface of the label discharge roller 27 is disposed substantially in line with a line extending from the ribs 31 of the upstream web pressure guide 23. The label guide roller 28 is freely rotationally disposed on the label dispenser opening 3 side of and near the label discharge roller 27. The label guide rollers 28 and label discharge roller 27 are positioned at substantially the same height. And the label guide rollers 28 and label discharge roller 27 can hold a peeled label. With this arrangement the label 7 does not need to be held with the trailing end thereof adhering to the web 8, and the label 7 can be easily removed by the user, because the label 7 can be completely disengaged from the web 8 for dispensing.

The downstream side of the downstream web pressure guide 24 is a ribbed guide 29 of which the portion opposite the downstream guide surface 21*e* of the web-bending guide 21 is a gentle arc curving away from the web-bending guide 21. The ribs of the guide 29 minimize the contact area with the front side 8*a* of the web 8. This guide 29 is made from a non-stick compound such as silicon plastic or fluoro plastic. Alternatively, the surface could be coated with a non-stick compound such as silicon plastic or fluoro plastic. Further alternatively, a non-stick compound such as silicone oil could be applied to the surface. This prevents the label adhesive from sticking to the treated surfaces. The web 8 is guided by and conveyed between the guide 29 and the downstream guide surface 21*e* of the web-bending guide 21.

The peeling roller 22 that is part of the label peeling mechanism 20 is made from non-stick silicon rubber. Alternatively, the surface could be coated with a non-stick compound such as silicon plastic or fluoro plastic. Further alternatively, a non-stick compound such as silicone oil could be applied to the surface. The web 8 is thus held and conveyed by the peeling roller 22 and platen roller 13 and discharged from the web exit 4 to the front of the printer.

Figure 6:
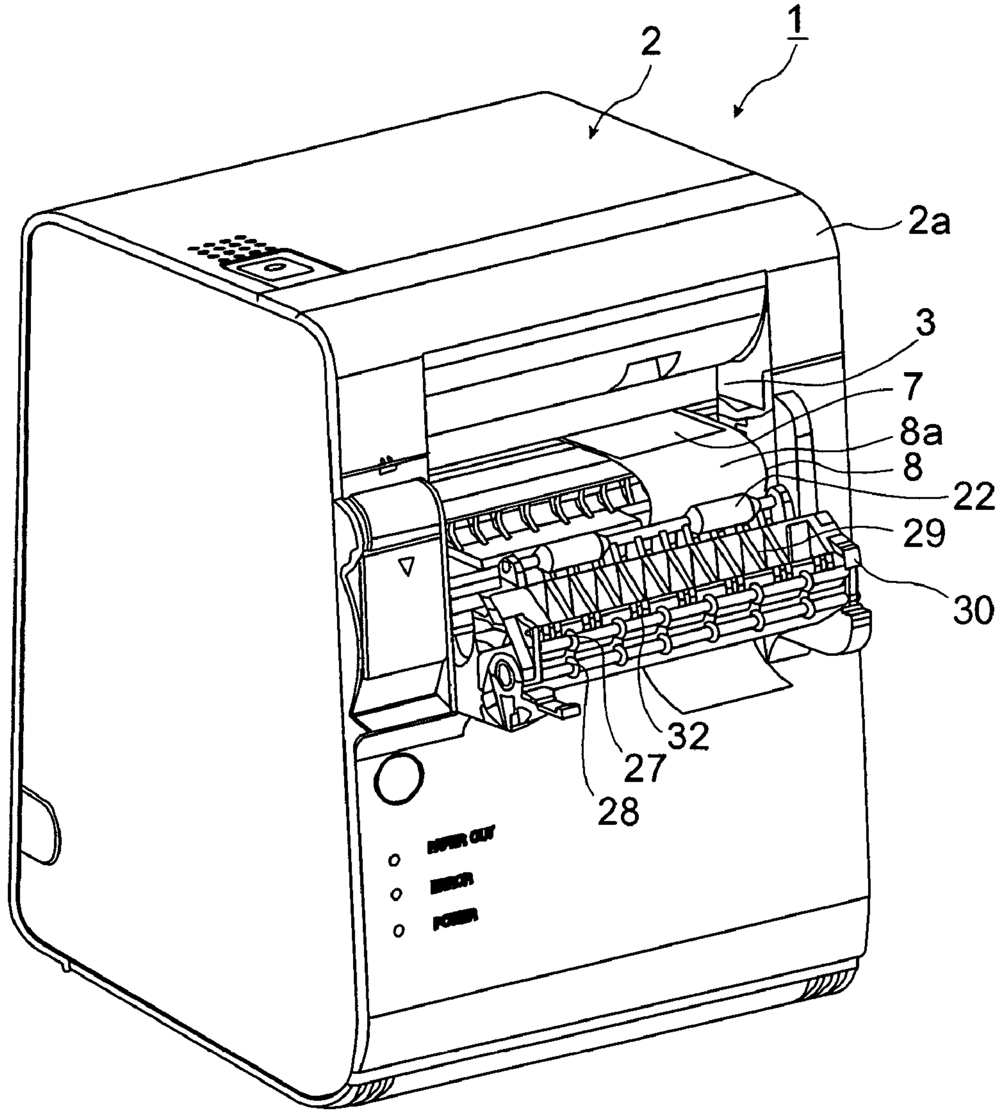
FIG. 6 is an oblique external view of the label printer shown in FIG. 1 with the door assembly open.
Figure 7:
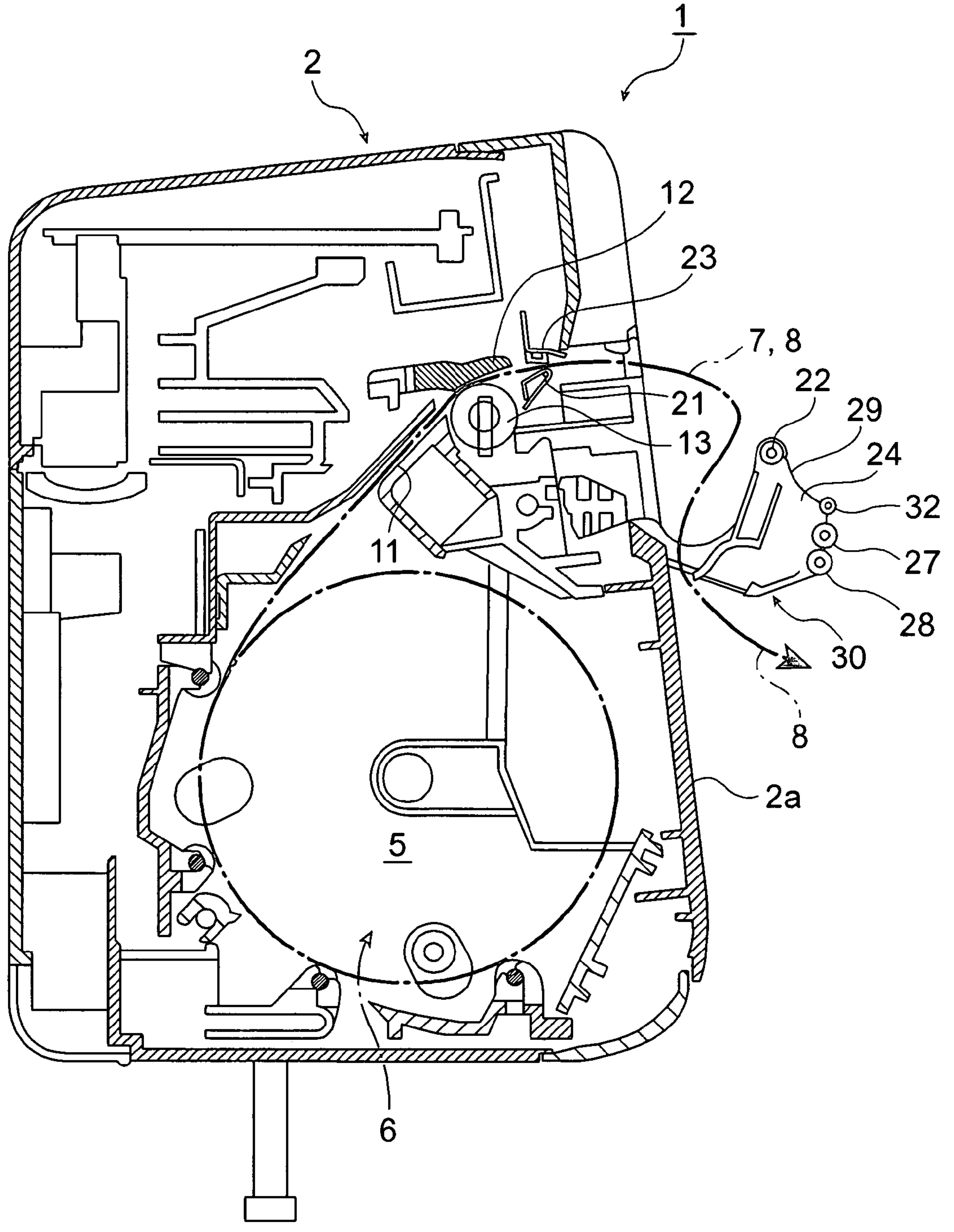
FIG. 7 is a section view of the label printer shown in FIG. 6.

As shown in FIG. 6 and FIG. 7, a label printer 1 according to this embodiment of the invention also has a door assembly 30 that opens around the top of the web exit 4 to the front of the printer. The peeling roller 22 of the label peeling mechanism 20, the guide roller 32, label discharge roller 27, and label guide rollers 28 are attached to this door assembly 30.

Opening the door assembly 30 thus opens the web discharge path from the web-bending guide 21 to the web exit 4. When the door assembly 30 is open, the leading end of the web 8 can thus be pulled out from the web exit 4 below the door assembly 30 as shown in FIG. 6 and FIG. 7, and simply closing the door assembly 30 then sets the web 8 in the label peeling mechanism 20. Note that the dot-dash line indicated by reference numeral 8 in FIG. 7 denotes the transportation path of the web 8 when the peeling mechanism 20 is used How the foregoing label peeling mechanism 20 peels labels 7 from the web 8 is described next below.

Specific information is printed to the surface of a blank label 7 by the print head 12 as the web 8 having the labels 7 affixed to the surface thereof is held between and conveyed by the print head 12 and platen roller 13. As the web 8 then travels between the upstream guide surface 21*c* of the web-bending guide 21 and the upstream ribs 31*d* of the upstream web pressure guide 23, the web 8 curves slightly to the surface side (label side) of the web and is then conveyed to the curved surface 21*a*. Because the upstream ribs 31*d* cause the web 8 to curve to the surface side, the web 8 with the labels 7 affixed thereto is conveyed along the upstream guide surface 21*c* of the web-bending guide 21 without lifting away from the upstream guide surface 21*c*.

The distance between the upstream web pressure guide 23 and the upstream guide surface 21*c* is slightly greater than the total combined thickness of the web 8 and labels 7. The upstream web pressure guide 23 also overlaps the upstream portion of the curved surface 21*a*. The web 8 with the labels 7 affixed thereto is thus conveyed along the ribs 31 to the curved surface 21*a* without lifting away from the ribs 31 of the upstream web pressure guide 23.

By rendering a plurality of ribs 31 at a specific interval across the width perpendicular to the transportation direction of the web 8, the contact area between the upstream web pressure guide 23 and the front side 8*a* of the web 8 is minimized. This makes it more difficult for adhesive on the front side 8*a* of the web 8 to transfer to the contact surface 31*a*, and even if adhesive is transferred to the contact surface 31*a* continued transportation of the web causes the adhesive to move gradually into the recesses (gaps) 31*c* on both sides of each rib 31 (and upstream ribs 31*d*).

The accumulation of adhesive on the web 8 contact surface of the upstream web pressure guide 23 is thus minimized and the web 8 can therefore be transported smoothly.

The curved surface 21*a* is a convex curved surface with a small radius of curvature, and the web 8 is conveyed curving in an acute angle along this curved surface 21*a*. As a result, when the label 7 is conveyed passed the upstream ribs 31*d*, the labels 7 head in the direction separating from the web 8, the stiffness of the label 7 causes the label 7 to gradually disengage from the web 8 to which the labels 7 are attached starting from the leading end of the label 7, and the label 7 is discharged from the label dispenser opening 3 in the same direction as the direction of transportation to that point. The web 8 follows the curved surface 21*a*, is guided between the downstream guide surface 21*e* and the guide roller 32 of the downstream web pressure guide 24 opposite the downstream guide surface 21*e*, passes between the downstream guide surface 21*e* and the concavely curved guide 29, and is discharged between the platen roller 13 and peeling roller 22 from the web exit 4. These arrangements enable guiding smoothly the web 8 and the peeling label 7 through each transportation path.

The outside surface of the guide roller 32 in the downstream web pressure guide 24 overlaps the curved surface 21*a*, thus preventing the web 8 from lifting away from the curved surface 21*a* after the web 8 is curved around the curved surface 21*a*. Because the web 8 is curved by the curved surface 21*a* to a small radius of curvature, the labels 7 are reliably peeled from the web 8.

The guide rollers 32 of the downstream web pressure guide 24 are disposed at a specific interval across the width of the web 8 in the direction perpendicular to the direction of web 8 travel, and the contact area of each rib with the front side 8*a* of the web 8 is minimized. This makes it more difficult for adhesive left on the front side 8*a* of the web 8 to which the labels 7 are affixed to stick to the guide roller 32, and any adhesive that does stick to the guide roller 32 is moved into the recessed portion 32*c* on each side of each guide roller 32 by movement of the web 8 over the guide roller 32.

Adhesion of the adhesive to the surface of the guide roller 32 that contacts the web 8 is thus minimized, and the web 8 is thus smoothly conveyed.

The guide 29 that guides the front side 8*a* to which the labels 7 are affixed on the web 8 and the peeling roller 22 that contacts the front side 8*a* of the web 8 both have a non-stick surface. This prevents adhesive left on the web 8 from adhering to the peeling roller 22 and the guide 29 contacting the front side 8*a* of the web 8. The web 8 is thus conveyed smoothly to and discharged from the web exit 4.

A label discharge roller 27 is located on the out-feed side of the labels 7 downstream from the curved surface 21*a* where the labels 7 begin to disengage the web 8. This label discharge roller 27 is rotationally driven in the label discharge direction in conjunction with rotation of the peeling roller 22. Therefore, when the leading end portion of a label 7 that has begun to disengage the web 8 rides onto the label discharge roller 27, the label 7 is conveyed toward the label dispenser opening 3 by the label discharge roller 27 in a direction different from that of the web 8. Once disengagement of the leading edge of the label 7 starts at the curved surface 21*a*, the peeling operation continues without interruption and the label 7 is guided to the label dispenser opening 3 by the label guide rollers 28 which rotates in conjunction with label 7 transportation. The label discharge roller 27 and label guide rollers 28 also both have a non-stick surface.

As described above, the label peeling mechanism 20 of the present invention has a plurality of ribs 31 formed with gaps therebetween widthwise to the web 8 in the direction perpendicular to the direction of web 8 travel on the upstream web pressure guide 23, which is the part that contacts the front side 8*a* of the web 8, and thus minimizes the contact area with the front side 8*a* of the web 8. Transfer of adhesive from the front side 8*a* of the web 8 to this contact portion is thus made more difficult, and the web 8 can be conveyed smoothly without paper jams and other problems.

Furthermore, the contact area of the downstream web pressure guide 24 with the front side 8*a* of the web 8 is also minimized by rendering a plurality of guide rollers 32 with a gap therebetween across the width of the web in the direction perpendicular to the direction of web 8 travel. This also makes transfer of adhesive from the front side 8*a* of the web 8 to this contact portion more difficult, and the web 8 can thus be conveyed smoothly without paper jams and other problems.

A label printer 1 having this label peeling mechanism 20 can thus reliably and completely peel and dispense printed labels 7 from the web 8 by means of the label peeling mechanism 20.

Furthermore, even if adhesive sticks to the ribs 31 or guide roller 32, the adhesive can be purged to the tapered surfaces 31*b*, 32*b* formed on each side. In addition, because a recess (gap) 31*c*, 32*c* is also rendered on both sides of the ribs 31 and guide roller 32, adhesive sticking to the ribs 31 or guide roller 32 can be moved into these recesses (gaps) 31*c*, 32*c*, thus eliminating any effect on web 8 transportation.

Adhesion of adhesive on the surfaces that contact the web 8 can thus be further suppressed, and the web can be smoothly conveyed without paper jams or other problems.

A non-stick surface is also rendered on the surfaces that contact the front side 8*a* of the web 8, including the peeling roller 22 and other rollers and the ribs and other portions of the web guide 29. Adhesion of adhesive on the surfaces that contact the web 8 can thus be minimized, and the web 8 can be conveyed smoothly without such problems as paper jams.

This non-stick treatment is not limited to the rollers and ribs, and can be applied to any of the parts that contact the front side (label side) 8*a* of the web 8.

As also described above, the peeling roller 22 and other rollers can be made from silicon rubber with good antistickiness characteristics.

Ribs are formed in the part of the upstream web pressure guide 23 that contacts the web 8, and rollers are used in the part of the downstream web pressure guide 24 that contacts the web 8. The invention shall not be so limited, however, and ribs or rollers can be selectively used as desired in the upstream web pressure guide 23 and downstream web pressure guide 24.

The label printer 1 according to this embodiment of the invention uses a thermal print head, but an inkjet head or other type of print head can be used.

Another embodiment of a label printer having a label peeling mechanism according to the present invention is described below according to a second embodiment of the invention. Like parts in this embodiment and the label printer 1 of the foregoing first embodiment are identified by like reference numerals, and further description thereof is omitted.

Figure 8:
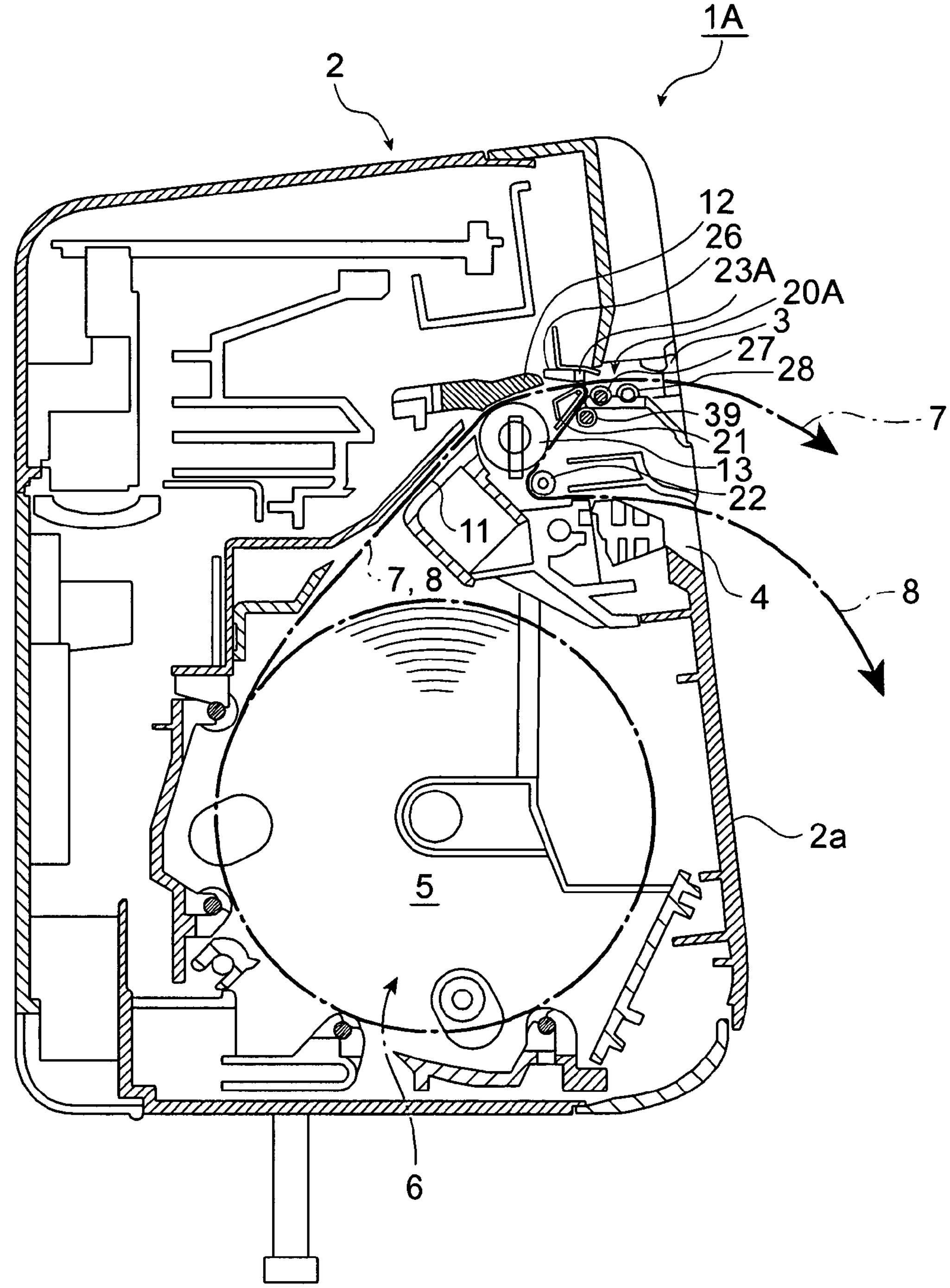
FIG. 8 is a section view showing a label printer according to another embodiment of the present invention.
Figure 9:
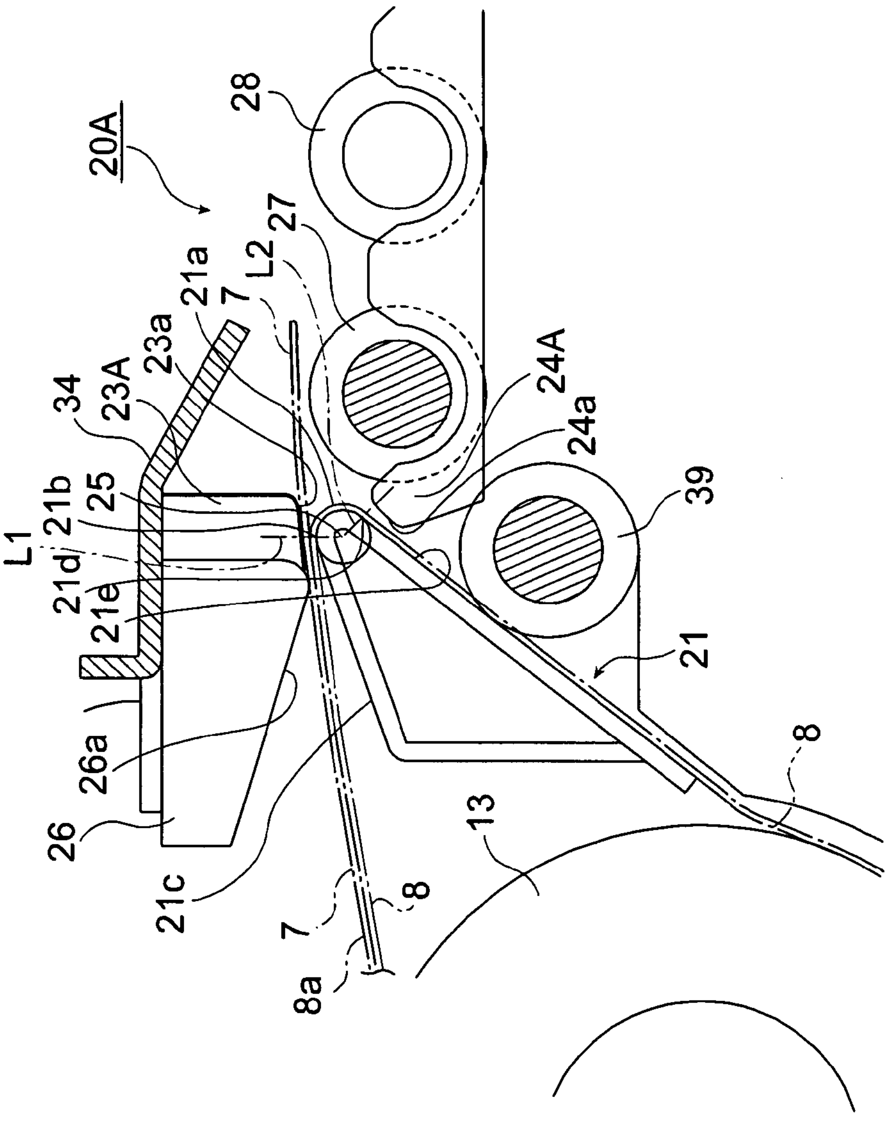
FIG. 9 is an enlarged partial section view showing the label peeling mechanism of the label printer shown in FIG. 8.

A label peeling mechanism 20A for peeling printed labels 7 from the web 8 is described first with reference to FIG. 8 and FIG. 9.

An upstream web pressure guide 23A having a plurality of guide surfaces 23*a* as the contact portions for contacting the web 8 disposed at a specific interval across the width of the web 8 is disposed opposite the upstream guide surface 21*c*. A downstream web pressure guide 24A having a plurality of guide surfaces 24*a* as the contact portions for contacting the web 8 disposed at a specific interval across the width of the web 8 is likewise disposed opposite the downstream guide surface 21*e*. The distance between the upstream guide surface 21*c* and the guide surfaces 23*a* of the upstream web pressure guide 23A is slightly greater than the combined total thickness of the web 8 and label 7. A web presser 26 having a convex arc shape that curves in the opposite direction as the direction that the web is curved by the web-bending guide 21 causes this distance to decrease gradually to the downstream side of the web transportation direction. This has the effect of pressing the web 8 to the web-bending guide 21 on the upstream side of the transportation path as described more fully below.

More specifically, the web presser 26 presses the web 8 on the upstream side of the curved surface 21*a* of the web-bending guide 21 near line L1 joining the end 21*b* and center of curvature 25 that define the curved surface 21*a*, and on the downstream side of the curved surface 21*a* of the web-bending guide 21 the guide surfaces 24*a* of the downstream web pressure guide 24A apply pressure to the web 8 near line L2 joining center of curvature 25 and end 21*d*. The web 8 is pressed on two points of the upstream side (L1) and the downstream side (L2) of the curved surface 21*a* of the web-bending guide 21. This arrangement prevents the web 8 from bulging away from the curved surface 21*a*, and enables conveying the web 8 through a smaller radius of curvature.

When the labels 7 travel through the curved portion of the web presser 26, the labels 7 are curved by this curved arc portion in the direction disengaging from the web 8, and can thus be more reliably peeled from the web 8. The web 8 is guided to the curved surface 21*a* of the web-bending guide 21 after being curved slightly to the surface side (label side) by the web presser 26, and is curved acutely around the curved surface 21*a*.

The guide surfaces 23*a* of the upstream web pressure guide 23A extend a specific length to the downstream side in the web transportation direction from the end 21*b* of the curved surface 21*a* of the web-bending guide 21. More specifically, the guide surfaces 23*a* extend to the downstream side from the line L1 joining the end 21*b* and center of curvature 25 that define the curved surface 21*a*. The guide surfaces 24*a* of the downstream web pressure guide 24A extend a specific length to the upstream side in the web transportation direction from the downstream-side end 21*d* of the curved surface 21*a*. More specifically, the guide surfaces 24*a* project upstream from the line L2 joining center of curvature 25 and end 21*d*.

In other words, a web presser 26 that causes the web 8 traveling toward the curved surface 21*a* to curve convexly to the surface side (label side) of the web is disposed at a position upstream in the web transportation direction from the upstream web pressure guide 23A. To cause the web 8 to curve slightly in the opposite direction as the direction in which the web 8 is curved by the curved surface 21*a*, the convex arc shaped pressure surface 26*a* of the web presser 26 projects slightly to the upstream guide surface 21*c* side from the guide surfaces 23*a* of the upstream web pressure guide 23. The web 8 is thus guided to the curved surface 21*a* of the web-bending guide 21 after being curved slightly to the surface side (label side) of the web by the web presser 26, and the web 8 is then curved acutely around the curved surface 21*a*.

The label discharge roller 27 is freely rotationally disposed on the downstream side near the curved surface 21*a* of the web-bending guide 21. The top portion of the outside surface of the label discharge roller 27 is disposed substantially in line with a line extending from the guide surfaces 23*a* of the upstream web pressure guide 23A. The label guide roller 28 is freely rotationally disposed on the label dispenser opening 3 side of and near the label discharge roller 27. The label guide roller 28 and label discharge roller 27 are positioned at substantially the same height. And the label guide roller 28 and label discharge roller 27 can hold a peeled label. With this arrangement the label 7 does not need to be held with the trailing end thereof adhering to the web 8, and the label 7 can be easily removed by the user because the label 7 can be completely disengaged from the web 8 for dispensing.

The label discharge roller 27 and label guide roller 28 include a plurality of rollers coaxially disposed with a gap therebetween across the width of the labels 7 so that the labels 7 are only contacted at a plurality of locations across the label width perpendicular to the label 7 transportation direction. This prevents such problems as it being difficult for the user to remove the labels 7 as a result of the adhesive side of the labels 7 sticking to the label discharge roller 27 and label guide roller 28. Furthermore, because the contact area exposed to the adhesive side of the labels 7 is small, interference with smooth dispensing of the labels 7 due to adhesive from the adhesive side of the labels 7 transferring to and accumulating on the label discharge roller 27 and label guide roller 28 is also prevented.

A power transfer roller 39 is disposed freely rotationally on the downstream side of the downstream web pressure guide 24A at a position opposite the downstream guide surface 21*e* of the web-bending guide 21. When the web 8 is conveyed between the power transfer roller 39 and downstream guide surface 21*e*, the power transfer roller 39 rotates in conjunction with the web 8.

The power transfer roller 39 is linked to the label discharge roller 27 through a power transfer mechanism such as a gear train not shown, and the label discharge roller 27 is thus rotationally driven in the direction discharging the label 7 to the label dispenser opening 3.

A manual cutter 34 is disposed above the label discharge roller 27. If the labels 7 are to be dispensed without being peeled from the web 8 (not using the label peeling mechanism 20A), the web 8 is loaded so that the web 8 is discharged from the label dispenser opening 3. The web 8 can then be manually cut using the manual cutter 34 with the printed labels 7 intact on the web 8.

Figure 10:
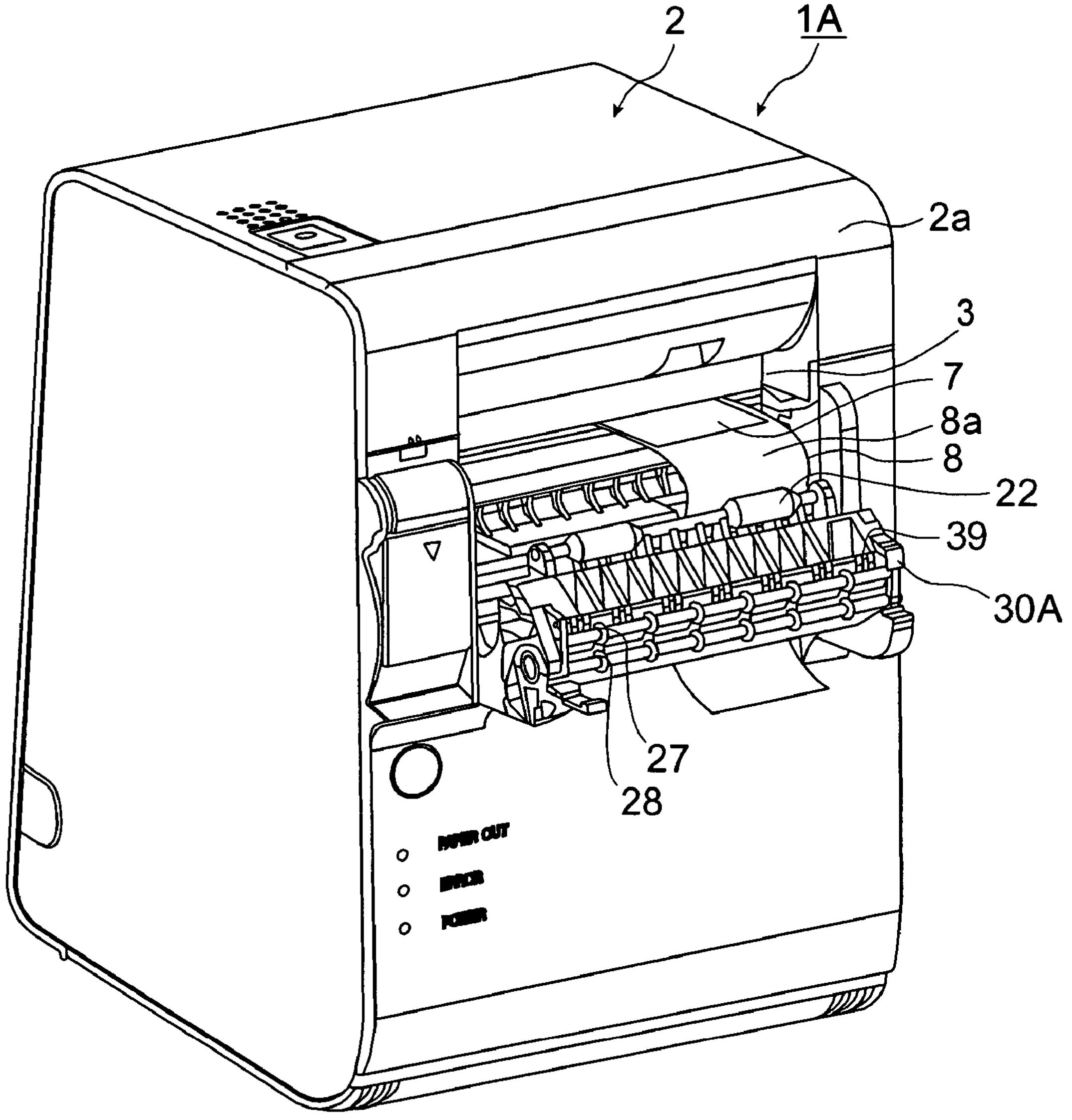
FIG. 10 is an external oblique view showing the door assembly of the label printer shown in FIG. 8 open.
Figure 11:
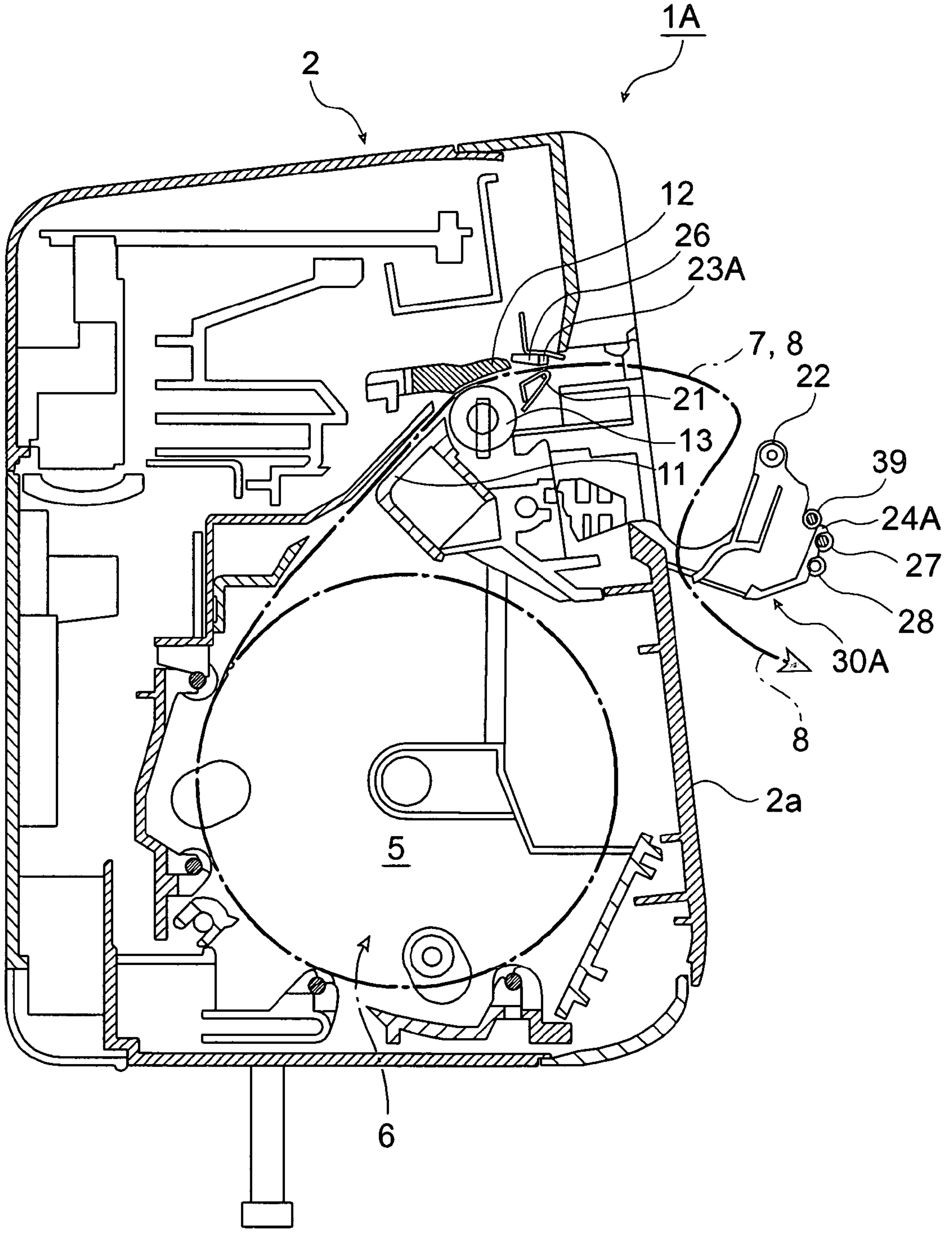
FIG. 11 is a section view of the label printer shown in FIG. 10.

As shown in FIG. 10 and FIG. 11, a label printer 1A according to this embodiment of the invention also has a door assembly 30A that opens around the top of the web exit 4 to the front of the printer. The peeling roller 22 of the label peeling mechanism 20A, label discharge roller 27, label guide roller 28, power transfer roller 39, and downstream web pressure guide 24A are attached to this door assembly 30A.

Opening the door assembly 30A thus opens the web discharge path from the web-bending guide 21 to the web exit 4. Therefore, to set the label dispensing mode in which the labels 7 are peeled from the web 8 and discharged from the label dispenser opening 3 (using the label peeling mechanism 20A), the door assembly 30A is opened, the leading end of the web 8 is pulled out from the web exit 4 below the door assembly 30A as shown in FIG. 10 and FIG. 11, and the door assembly 30A is then simply closed. To set the label dispensing mode in which the labels 7 are discharged intact on the web 8 from the label dispenser opening 3 (the label peeling mechanism 20A is not used), the web 8 is pulled out above the door assembly 30A (that is, from the label dispenser opening 3) instead of through the web exit 4, and the door assembly 30A is then closed.

The label 7 peeling operation of this label peeling mechanism 20A is described next.

Specific information is printed to the surface of a blank label 7 by the print head 12 as the web 8 having the labels 7 affixed to the surface thereof is held between and conveyed by the platen roller 13 and printed by the print head 12. The web 8 is then conveyed toward the curved surface 21*a* after being curved slightly to the surface side (label side) of the web as a result of passing between the upstream guide surface 21*c* of the web-bending guide 21 and the web presser 26. Because the web is curved to its surface side (label side) by the web presser 26, the web 8 with intact labels 7 is conveyed along the upstream guide surface 21*c* without lifting away from the upstream guide surface 21*c* of the web-bending guide 21.

The upstream web pressure guide 23A is located downstream from the web presser 26, and the distance between the guide surfaces 23*a* and the upstream guide surface 21*c* is slightly greater than the combined thickness of the web 8 and label 7. The guide surfaces 23*a* of the upstream web pressure guide 23A also overlap the upstream portion of the curved surface 21*a*. As a result, the web 8 with intact labels 7 is conveyed along the guide surfaces 23*a* to the curved surface 21*a* without being lifted away from the guide surfaces 23*a* of the upstream web pressure guide 23A.

The curved surface 21*a* is a convex curved surface with a small radius of curvature, and the web 8 is conveyed curving in an acute angle along this curved surface 21*a*. As a result, when the label 7 is conveyed passed the web presser 26, the labels 7 head in the direction separating from the web 8, the stiffness of the label 7 causes the label 7 to gradually disengage from the web 8 to which the labels 7 are attached starting from the leading end of the label 7, and the label 7 is discharged in the same direction as the direction of transportation to that point. The web 8 follows the curved surface 21*a*, is guided between the downstream guide surface 21*e* and the guide surfaces 24*a* of the downstream web pressure guide 24A opposite the downstream guide surface 21*e*, passes between the downstream guide surface 21*e* and the power transfer roller 39, and is discharged between the platen roller 13 and peeling roller 22 from the web exit 4.

The guide surfaces 24*a* of the downstream web pressure guide 24A overlap the curved surface 21*a*, and the web 8 therefore does not lift away from the curved surface 21*a* after the web 8 is curved around the curved surface 21*a*. Because the web 8 is curved by the curved surface 21*a* to a small radius of curvature, the labels 7 are reliably peeled from the web 8.

A label discharge roller 27 is located on the out-feed side of the labels 7 downstream from the curved surface 21*a* where the labels 7 begin to disengage the web 8. This label discharge roller 27 is rotationally driven in the label discharge direction by the power transfer roller 39, which rotates in conjunction with the conveyed web 8. Therefore, when the leading end portion of a label 7 that has begun to disengage the web 8 rides onto the label discharge roller 27, the label 7 is conveyed toward the label dispenser opening 3 by the label discharge roller 27 in a direction different from that of the web 8. Once disengagement of the leading edge of the label 7 starts at the curved surface 21*a*, the peeling operation continues without interruption and the label 7 is guided to the label dispenser opening 3 by the label guide rollers 28 which rotates in conjunction with label 7 transportation.

Figure 12:
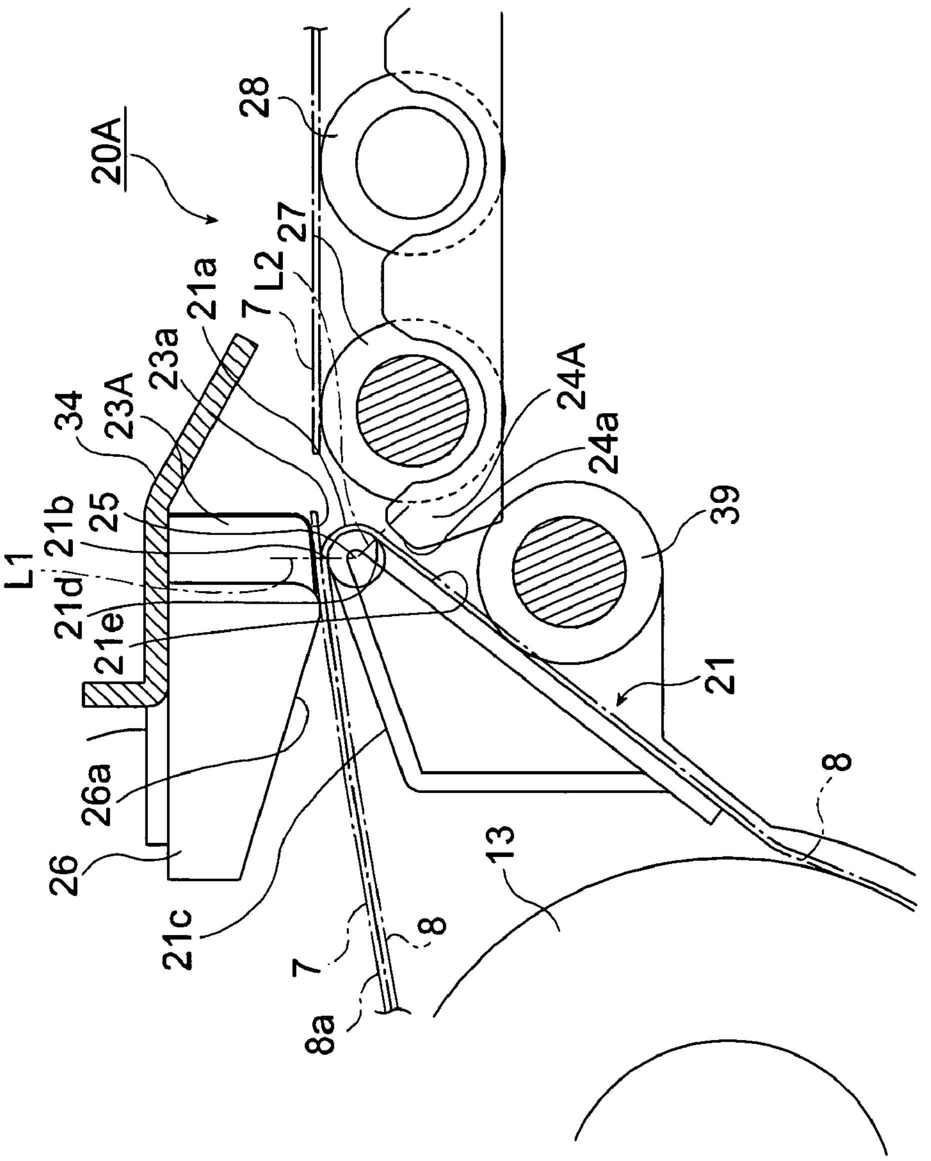
FIG. 12 is an enlarged partial section view showing label support in the label peeling mechanism of the present invention.
Figure 13:
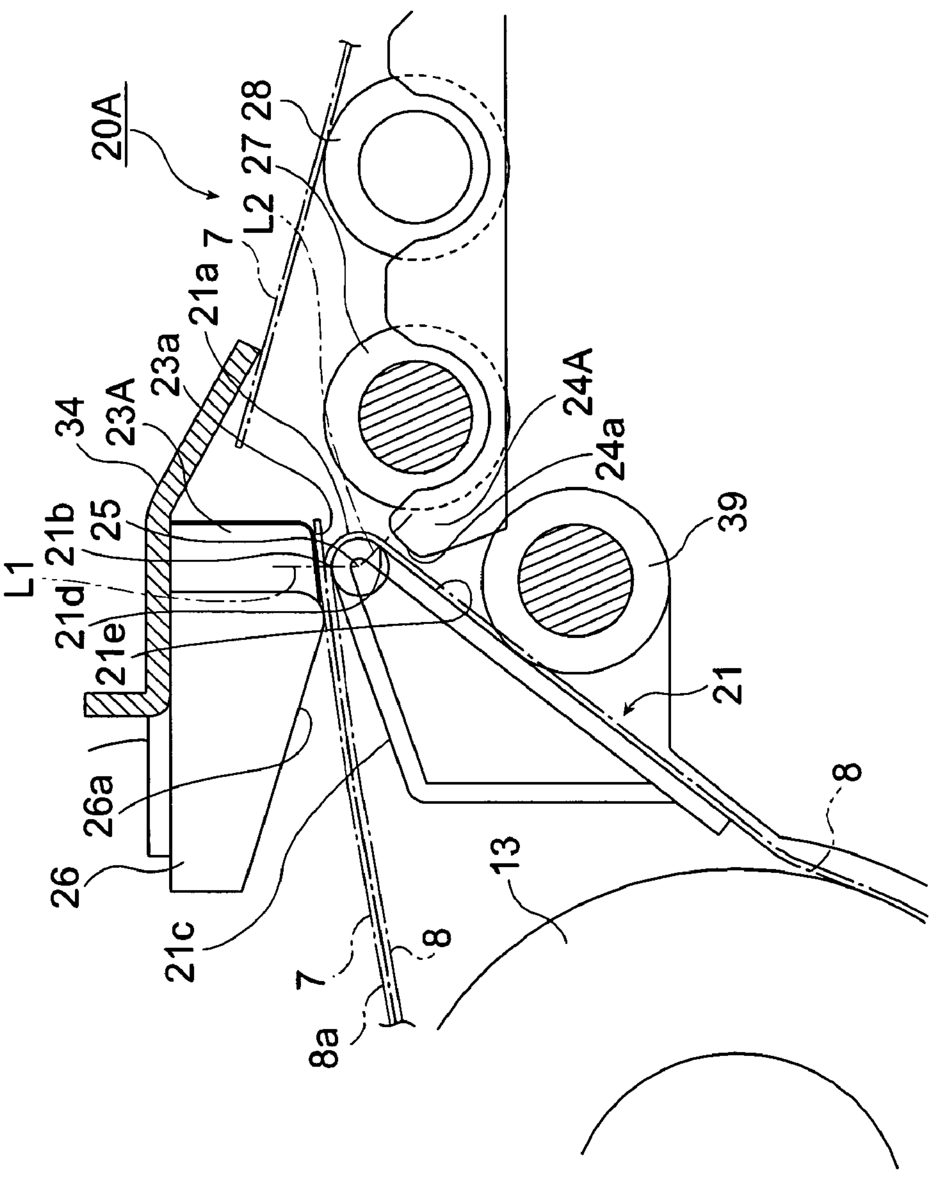
FIG. 13 is an enlarged partial section view showing label support in the label peeling mechanism of the present invention.

As shown in FIG. 12, a label 7 discharged to the label dispenser opening 3 is held between the label discharge roller 27 and label guide roller 28 and can then be taken by the user (same as first embodiment). When the label 7 is removed by the user, a detection signal from a sensor not shown for detecting the presence of a label 7 at the dispensing position triggers printing and peeling the next label 7 by the print head 12 and label peeling mechanism 20A, and the next label 7 is thus similarly discharged from the label dispenser opening 3 to the dispensing position.

Figure 15:
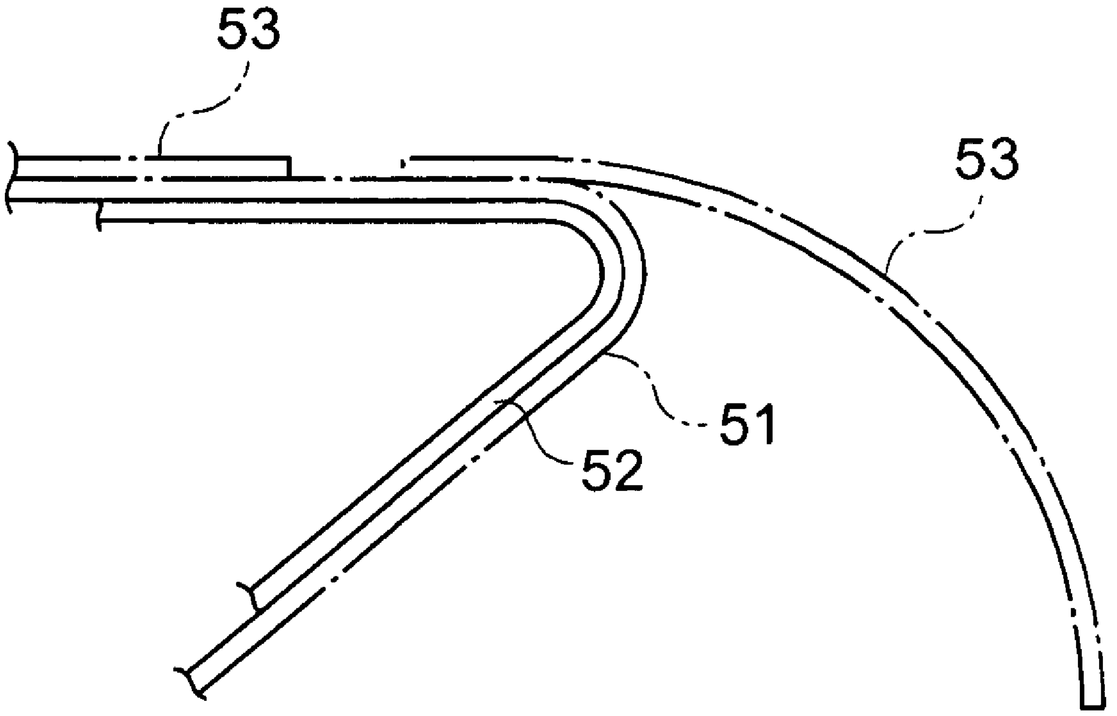
FIG. 15 is a section view of a conventional label peeling mechanism showing a drooping label.

When a label 53 is completely peeled from the web 51 by the web bending guide 52 of a conventional label peeling mechanism as shown in FIG. 15, there is nothing to support the label after the label is completely peeled. The web 51 is therefore advanced to a position where a slight portion of the trailing end of the label 53 remains affixed to the web 51, thus holding the label 53 for removal by the user. The weight of the label 53 held at the trailing end thereof often causes the leading end of the label 53 to droop. When the label 53 thus droops, removing the label 53 can become difficult and the label 53 may stick to the side of the printer case.

Furthermore, if the label 53 thus droops, the position of the label 53 varies and label detection by the sensor that detects the presence of a peeled label 53 becomes imprecise. More particularly, the sensor may incorrectly detect that there is no label even though the label 53 has not been removed, and the next label my be incorrectly dispensed. These drooping or dropping of the label 53 is a particular problem when the label 53 is long, when the label 53 is thin with little rigidity, or when there is a breeze, for example.

Yet further, because the trailing end of the label 53 remains affixed to the web 51, the label 53 must be peeled from the web 51 by the user and this can be difficult when an adhesive with high adhesive strength is used.

With the label peeling mechanism 20A of a label printer 1A according to this embodiment of the invention, however, the trailing end of the label 7 is held by the label discharge roller 27 and the middle part of the label 7 is supported by the label guide roller 28 when the label 7 is discharged by the label discharge roller 27 to the label dispenser opening 3 and positioned at the dispensing position. The label 7 is thus supported at a plurality of positions at the trailing end and middle, and is thus held without drooping at the dispensing position.

Furthermore, even if the trailing end of the label 7 is separated from the label discharge roller 27 by wind or other cause, for example, the trailing end of the label contacts the manual cutter 34 while the middle portion of the label 7 remains supported by the label guide roller 28. The label 7 is thus prevented from dropping or drooping.

As described above, a plurality of guide surfaces 23*a* which are the portions (ribs) that contact the web 8 are disposed to the upstream web pressure guide 23A with a specific gap therebetween across the width of the web 8 in a label peeling mechanism 20A used in a label printer 1A according to this embodiment of the invention, thus minimizing the contact area with the front side 8*a* of the web 8. The transfer of adhesive from the front side 8*a* of the web 8 to the contact surfaces is thus inhibited, and the web 8 can be smoothly conveyed without such problems as paper jams.

The downstream web pressure guide 24A also has a plurality of guide surfaces 24*a* which are the portions (ribs) that contact the web 8 disposed with a specific gap therebetween across the width of the web 8, thus minimizing the contact area with the front side 8*a* of the web 8. The transfer of adhesive from the front side 8*a* of the web 8 to the contact surfaces is thus inhibited, and the web 8 can be smoothly conveyed without such problems as paper jams.

A label printer 1A having a label peeling mechanism 20A according to this embodiment of the invention can thus reliably and completely peel and dispense printed labels 7 from the web 8 by means of the label peeling mechanism 20A.

Furthermore, because the label peeling mechanism 20A in a label printer 1A according to this embodiment of the invention has a label guide roller 28 for supporting labels 7 peeled and discharged from the web 8 at the web-bending guide 21, labels 7 peeled from the web 8 can be reliably supported. The labels 7 can thus be reliably prevented from dropping or drooping even when the labels 7 are long or there is a breeze.

Furthermore, the label peeling mechanism 20A can reliably disengage printed labels 7 from the web 8 and then support the peeled labels 7, and eliminate such problems as the peeled label 7 drooping and the adhesive side sticking to the printer case.

Detection by a sensor that detects the presence of a peeled label 7 is also reliable because the position of the peeled label 7 does not change as a result of the label drooping. Problems such as the next label 7 being dispensed even though the previous label 7 has not been removed can thus also be reliably prevented.

Figure 14:
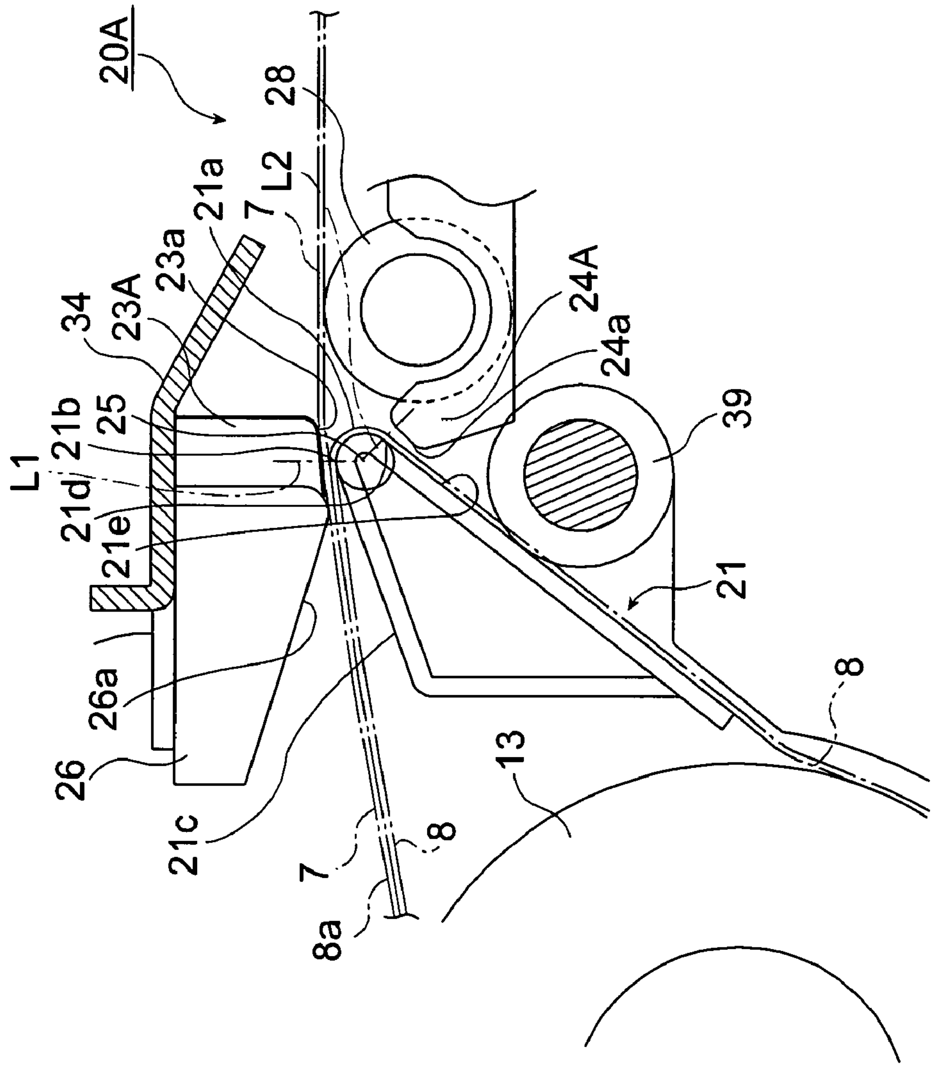
FIG. 14 is an enlarged partial section view showing the label peeling mechanism according another aspect of the present invention.

As shown in FIG. 14, the label discharge roller 27 could be omitted and the label guide roller 28 positioned where the label discharge roller 27 is located.

In this case the label guide roller 28 turns in conjunction with the dispensed labels 7 and guides the labels 7 in the dispensing direction. The label 7 is conveyed to the label dispenser opening 3 to a position where a small portion of the trailing end of the label 7 remains affixed to the web 8, thereby holding the trailing end of the label 7. The middle of the label 7 is supported by the label guide roller 28. The label 7 is thus supported at a plurality of positions at the trailing end and middle portions of the label 7, and is thus supported without drooping.

A synthetic plastic such as polyacetal can be used for the surface material of the label discharge roller 27 and label guide roller 28, but a combination of chloroprene rubber rollers with relatively high bond strength relative to the label 7 adhesive and silicon rubber rollers with relatively low bond strength can alternatively be used. The adhesive strength of the acrylic emulsion adhesive used as the label 7 adhesive is very low relative to silicon rubber, thus preventing the adhesive from sticking to the rollers. By using a plurality of coaxially disposed rollers with different adhesive strength relative to the label 7 adhesive, the combination of rollers can be adjusted to provide the ideal label 7 holding power.

The label discharge roller 27 and label guide roller 28 can be arranged in series in the transportation direction of the label 7, or the rollers can be staggered at different positions across the width of the labels 7. Staggering the rollers enables supporting the labels 7 more reliably when the labels 7 are narrow.

The rollers for conveying the longer peeled labels 7 to the label dispenser opening 3 shall not be limited to the label discharge roller 27 and label guide roller 28, and three or more such rollers could be provided.

The label printer 1A according to this embodiment of the invention uses a thermal print head, but the invention shall not be so limited and an inkjet head or other type of print head can be used.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A label peeling mechanism for use in a label printer having a printing head and platen roller comprising:

a web-bending guide having a guide surface portion and a convex curved surface for bending a continuous web having labels affixed to the front surface thereof to an angle of less than or equal to 90 degrees with respect to the back side of said web;

an upstream web pressure guide disposed downstream of the printing head and platen roller at a location upstream in a web transportation direction from said convex curved surface opposite said guide surface portion for contacting the surface of the web with the labels affixed thereto before the web is curved around said curved surface of said web-bending guide and including a substantially flat guide surface of a given length extending from one end of the curved surface of the web bending guide toward the downstream side in the web transportation direction; and a downstream web pressure guide disposed downstream in the web transportation direction from said contact surface opposite a downstream guide surface portion of said web-bending guide;

wherein said upstream web pressure guide has a plurality of contact parts aligned with respect to said web-bending guide for contacting the surface of said web before said labels are peeled from said web;

such that said web is conveyed between said upstream guide surface portion of said web-bending guide and said plurality of contact parts in said upstream web pressure guide, curves 90 degrees or less around said convex curved surface, and is then conveyed between said downstream guide surface portion and said downstream web pressure guide, and said labels are peeled from said web as said web is conveyed curved around said convex curved surface.

2. A label peeling mechanism as described in claim 1, wherein said contact parts form ribs, and said ribs have a tapered surface on both sides near the distal end that contacts said web, forming a tapered section that gradually narrows from the base to the distal end of said rib.

3. A label peeling mechanism as described in claim 1, wherein said contact parts form rollers, and said rollers have a tapered surface on both sides near the outside circumference end that contacts said web, forming a tapered section that gradually narrows from the base to the outside circumference.

4. A label peeling mechanism as described in claim 1, wherein said contact parts of said upstream web pressure guide curve to the downstream side in the web transportation direction in the opposite direction as the direction in which said web is bent by said web-bending guide and gradually narrow the web transportation path.

5. A label peeling mechanism as described in claim 1 for use in a label printer having a printing head and platen roller further comprising:

a plurality of recessed parts in said upstream web pressure guide which do not contact the surface of said web with said recessed parts being disposed across the web width with a gap therebetween perpendicular to the web transportation direction and being aligned relative to web bending guide such that said web is conveyed between said upstream guide surface portion and said plurality of recessed parts in said upstream web pressure guide which limits contact with the web to only sections of said upstream web pressure guide lying between the recessed parts before said labels are peeled from said web.

6. A label peeling mechanism as described in claim 1 for use in a label printer having a printing head and platen roller wherein at least the surface of said plurality of contact parts which contacts said web surface when said web is conveyed is composed of a non-stick material composition or has a non-stick coated surface thereon.

7. A label peeling mechanism as described in claim 1, further comprising a label guide roller which supports said labels as said labels are peeled from said web and discharged as said web is conveyed curved less than or equal to 90 degrees around said convex curved surface.

8. A label peeling mechanism as described in claim 7, comprising a label discharge roller which discharges labels peeled from said web disposed between said web-bending guide and said label guide roller;

wherein a trailing end portion of said label is supported by said label discharge roller and a middle portion of said label is supported by said label guide roller as said label is peeled and discharged.

9. A label peeling mechanism as described in claim 7, wherein a trailing end portion of said label is supported by said web and a middle portion of said label is supported by said label guide roller as said label is peeled and discharged.

10. A label peeling mechanism as described in claim 8, wherein said label discharge roller is a coaxial assembly of a plurality of rollers and the adhesive strength of the surface of said rollers when in contact with the adhesive surface of said labels differs.

11. A label peeling mechanism as described in claim 7, wherein said label guide roller is a coaxial assembly of a plurality of rollers and the adhesive strength of the surface of said rollers when in contact with the adhesive surface of said labels differs.

12. A label printer including a label peeling mechanism as described in claim 1, comprising:

a print head for printing to labels affixed to a continuous web;

a transportation mechanism for conveying said continuous web in a transportation direction past said print head;

a web discharge opening for discharging said web after said labels are peeled; and a label dispenser opening for discharging said labels after said labels are peeled from said web.

13. A label printer as described in claim 12, wherein said print head is a thermal head; and said transportation mechanism comprises a platen roller which is pressed to said thermal head.

14. A label peeling mechanism as described in claim 1, wherein said guide surface portion of said web-bending guide is a substantially flat surface which is spaced a distance apart from said upstream web pressure guide which decreases gradually toward the downstream side of the web transportation direction.

15. A label peeling mechanism as described in claim 1, wherein said upstream web pressure guide has a convex arc shape that curves in a direction opposite the direction that the web is curved by the curved surface of the web bending guide.

* * * * *